United States Patent [19]
Iwatani et al.

[11] Patent Number: 5,923,095
[45] Date of Patent: Jul. 13, 1999

[54] CONTROL APPARATUS FOR ONBOARD AC GENERATOR FOR MOTOR VEHICLE

[75] Inventors: Shiro Iwatani; Tatsuki Kouwa, both of Tokyo, Japan

[73] Assignee: Mitsubishi Denki Kabushiki Kaisha, Tokyo, Japan

[21] Appl. No.: 08/794,021

[22] Filed: Feb. 3, 1997

[30] Foreign Application Priority Data

Jul. 12, 1996 [JP] Japan ................................ 8-183606

[51] Int. Cl.$^6$ ........................................................ B60L 1/00
[52] U.S. Cl. ............................................ 307/10.1; 322/80
[58] Field of Search ................................ 307/9.1, 10.1, 307/100, 98; 320/2, 12, 61, 64–66, 68, 69, 127, 128, 137; 322/62–64, 75, 26, 80, 83

[56] References Cited

U.S. PATENT DOCUMENTS

| 5,157,321 | 10/1992 | Kato et al. | 320/64 |
| 5,189,360 | 2/1993 | Schwartz et al. | 322/80 |
| 5,245,271 | 9/1993 | Simmons | 322/64 |
| 5,289,105 | 2/1994 | Boella et al. | 320/64 |
| 5,541,456 | 7/1996 | Maggioni et al. | 307/10.1 |
| 5,608,309 | 3/1997 | Hikita et al. | 320/64 |

FOREIGN PATENT DOCUMENTS

| 54-140224 | 9/1979 | Japan . |
| 57-88840 | 6/1982 | Japan . |
| 1065785 | 4/1967 | United Kingdom . |
| 1174875 | 12/1969 | United Kingdom . |
| 1205672 | 9/1970 | United Kingdom . |
| 1413467 | 11/1975 | United Kingdom . |
| 2034135 | 5/1980 | United Kingdom . |
| 2087605 | 5/1982 | United Kingdom . |

Primary Examiner—Richard T. Elms
Attorney, Agent, or Firm—Sughrue, Mion, Zinn, Macpeak & Seas, PLLC

[57] ABSTRACT

A control apparatus for an onboard AC generator for a motor vehicle is capable of suppressing erroneous operation of the switching circuit due to a leakage current to thereby prevent the output voltage of the AC generator from abnormal rising. The control apparatus includes an AC generator (1) including a field winding (102), a rectifier circuit (2) for converting an output voltage of the AC generator (1) into a DC voltage, a battery (5) charged with the DC voltage, a switching circuit (3) constituted by a low-side switch for turning on/off a current flow loop extending through the field winding (102), a control unit (4) for controlling on/off-operation of the switching circuit (3) so that a voltage (VB) appearing at a charging terminal of the battery (5) matches with a predetermined voltage level, and a resistor (303) inserted between a control input terminal of the switching circuit (3) and the ground potential.

6 Claims, 5 Drawing Sheets

CONTROL APPARATUS FOR ONBOARD AC GENERATOR FOR MOTOR VEHICLE

BACKGROUND OF THE INVENTION

1. Field of the Invention

The present invention generally relates to a control apparatus for an AC generator mounted on a motor vehicle (also referred to as the vehicle-onboard AC generator control apparatus), which apparatus is designed to perform on/off control of a current flowing through a field winding of the AC generator by means of a switching circuit. More particularly, the invention is concerned with a vehicle-onboard AC generator control apparatus which is designed to suppress an erroneous control of the switching circuit due to a leakage current, to thereby prevent the output voltage of the AC generator from rising abnormally.

2. Description of Related Art

For having better understanding of the present invention, the background art will first be reviewed briefly.

FIG. 7 is a circuit diagram showing a circuit configuration of a conventional vehicle-onboard AC generator control apparatus disclosed in Japanese Patent Publication No 63-20098. Referring to, FIG. 7 an AC generator 1 driven by an internal combustion engine (hereinafter referred to simply as the engine) of a motor vehicle (not shown) includes three-phase armature coils 101 and a field winding 102 composed of field coils disposed in opposition to the three-phase armature coils 101, respectively.

A rectifier circuit 2 for converting the output voltage of the three-phase armature coil assembly 101 into a DC voltage is constituted by three pairs of diodes inserted between a main output terminal 201 and a ground terminal 202 of the ground potential, wherein each of the output terminals of the individual three-phase armature coils 101 is connected to a junction between the diodes of each pair.

A switching circuit 3 for turning on/off (opening/closing) a current flow path or loop extending through the field winding 102 includes a pair of power transistors 301A and 301B connected in the form of a Darlington circuit and a fly-wheel diode 302 which is connected with reverse polarity so as to shunt the current flow loop extending through the field winding 102.

The fly-wheel diode 302 has an anode connected to the collectors of the power transistors 301A and 301B, while the cathode of the fly-wheel diode 302 is connected to the main output terminal 201 of the rectifier circuit 2.

On the other hand, the field winding 102 has one end connected to the main output terminal 201 of the rectifier circuit 2 and the output terminal of a battery 5, while the other end of the field coil 102 is grounded by way of a collector-emitter path of the power transistor circuitry 301, whereby a current supply loop through which a field current IF can flow is realized.

A control unit 4 which may be constituted by a microcomputer applies a control signal C to the base of the power transistor 301A constituting a part of the power transistor Darlington circuit 301 incorporated in the switching circuit 3 to thereby control the on/off operation of the power transistor circuitry 301 so that a charging terminal voltage VB appearing at a charging terminal of the battery 5 coincides or matches with a predetermined voltage.

The onboard battery 5 mounted on the motor vehicle (not shown) is charged with a DC voltage output from the rectifier circuit 2 while supplying electric power to the field winding 102 and the control unit 4. A key switch 6 which is turned on (i.e., closed) upon starting of the engine of the motor vehicle is inserted between the battery 5 and the control unit 4 to thereby allow the control unit 4 to be supplied with the electric power from the battery upon starting of the engine operation.

Input to the control unit 4 is not only the charging terminal voltage VB from the charging terminal of the battery 5 but also detection signals output from a variety of sensors (not shown) mounted on the motor vehicle to perform arithmetic operations for the purpose of controlling operations of the engine as well as fittings of the motor vehicle.

Next, description will turn to operation of the conventional vehicle-onboard AC generator control apparatus shown in FIG. 7.

When the key switch 6 is closed or turned on, the control unit 4 is put into operation to output the control signal C in dependence on the charged state of the battery 5.

When the power transistor circuitry 301 incorporated in the switching circuit 3 is turned on in response to the control signal C, the field current IF flows through the field coil 102 along the path or loop formed by the battery 5, the field coil 102, the power transistor circuitry 301 and the ground.

Subsequently, when the AC generator 1 is driven by the engine to start generation of electricity, the three-phase AC voltage is output from the three-phase armature coil assembly 101 and applied to the rectifier circuit 2 to be thereby converted into a DC voltage. As a result of this, the battery 5 is charged with the DC voltage, whereby the charging terminal voltage VB appearing at the charging terminal of the battery 5 increases.

The charging terminal voltage VB of the battery 5 is detected by the control unit 4. When the charging terminal voltage VB increases beyond a predetermined voltage level, the control signal C for the switching circuit 3 is interrupted, as a result of which the power transistor circuitry 301 is turned off.

Consequently, the field current IF flowing through the field coil 102 decreases, involving lowering of the voltage generated by the AC generator 1, which is accompanied with corresponding lowering of the charging terminal voltage VB at the charging terminal of the battery 5.

On the other hand, when the charging terminal voltage VB of the battery 5 lowers below the predetermined voltage level, the control unit 4 outputs the control signal C to turn on the power transistor circuitry 301 to thereby cause the voltage output from the AC generator 1 as well as the charging terminal voltage VB of the battery 5 to increase.

In this manner, the charging terminal voltage VB of the battery 5 is controlled so as to coincide or match with the predetermined voltage level.

In this conjunction, it should be mentioned that the AC generator 1, the rectifier circuit 2 and the switching circuit 3 are usually installed within an engine room to be placed under severe environmental conditions. Consequently, there may undesirably take place a flow of a leakage current IL between an cathode electrode line of the battery 5 from which the charging terminal voltage VB is output and a control input terminal of the power transistor circuitry 301, as indicated by a broken line path in FIG. 7, due to deposition of moisture, dusts and others.

When such leakage current IL occurs, the power transistor circuitry 301 will be turned on (i.e., switched to the conducting state) regardless of whether the control signal C is issued or not, as a result of which the field current IF increases uncontrollably.

When the situation mentioned above arises, the output voltage of the AC generator 1 rises abnormally to bring about overcharging of the battery 5. Thus, not only the battery 5 is subjected to premature deterioration but also electric loads or devices such as head lamps and other electrical devices installed on the motor vehicle may be damaged under application of a high voltage. Besides, the ignition system and other fittings of the engine may be injured to disorder or ultimately stop the operation of the engine.

As is apparent from the above description, in the case of the conventional vehicle-onboard AC generator control apparatus known heretofore, no measures are taken to cope with occurrence of the leakage current IL which flows to the control input terminal of the switching circuit 3. Consequently, the vehicle-onboard AC generator control apparatus suffers serious problems that the output voltage of the AC generator 1 rises abnormally due to erroneous operation of the switching circuit 3 brought about by the leakage current IL to injure not only the battery 5 but also various electric device and fittings of the engine and the motor vehicle.

SUMMARY OF THE INVENTION

In the light of the state of the art described above, it is an object of the present invention to provide a control apparatus for an onboard AC generator for a motor vehicle (i.e., a vehicle-onboard AC generator control apparatus) which is capable of suppressing erroneous operation of the switching circuit due to the leakage current to thereby prevent the output voltage of the AC generator from abnormal rising.

In view of the above and other objects which will become apparent as the description proceeds, there is provided according to a first aspect of the present invention a vehicle-onboard AC generator control apparatus, which includes an AC generator including a field winding, a rectifier circuit for converting an output voltage of the AC generator into a DC voltage, a battery charged with the DC voltage, a switching circuit constituted by a low-side switch for turning on/off a current flow loop extending through the field winding, a control unit for controlling on/off-operation of the switching circuit so that a voltage appearing at a charging terminal of the battery matches with a predetermined voltage level, and a resistor inserted between a control input terminal of the switching circuit and the ground potential.

By virtue of the arrangement of the vehicle-onboard AC generator control apparatus described above, the erroneous operation of the switching circuit due to the leakage current can be suppressed satisfactorily, whereby the output voltage of the AC generator is prevented from rising abnormally, to a great advantage.

In a preferred mode for realizing the first aspect of the invention, the resistor should have a resistance value which falls within a range of 10 Ω to 1000 Ω.

By using the resistor having a resistance value mentioned above, the erroneous operation of the switching circuit due to the leakage current can be suppressed more positively.

For realizing the first aspect of the invention, the switching circuit may preferably be constituted by a plurality of power transistors connected in the form of a Darlington circuit.

With the arrangement described above, the erroneous operation of the switching circuit due to the leakage current can be suppressed satisfactorily with high reliability, whereby the output voltage of the AC generator can be prevented from abnormal rising more positively.

In yet another preferred mode for realizing the first aspect of the invention, the switching circuit may be constituted by using a single power transistor.

With the arrangement described above, the switching circuit can be implemented inexpensively while protecting the switching circuit against erroneous operation due to the leakage current with the output voltage of the AC generator being prevented from rising abnormally.

In a further preferred mode for realizing the first aspect of the invention, the switching circuit may be constituted by employing a MOSFET (Metal-Oxide-Semiconductor Field-Effect Transistor)-type power transistor.

With the arrangement described above, similar and advantageous effects as mentioned above can be achieved as well. Namely, the erroneous operation of the switching circuit due to the leakage current can be suppressed with the output voltage of the AC generator being prevented from abnormal rise.

Further provided according to a second aspect of the present invention is a vehicle-onboard AC generator control apparatus, which includes an AC generator having a field winding, a rectifier circuit for converting an output voltage of the AC generator into a DC voltage, a battery charged with the DC voltage, a switching circuit constituted by a high-side switch for turning on/off a current flow loop extending through the field winding, a control unit for controlling on/off-operation of the switching circuit so that a voltage appearing at a charging terminal of the battery is maintained at a level conforming with a predetermined voltage level, and a resistor inserted between a control input terminal and a power supply terminal of the switching circuit.

With the arrangement of the vehicle-onboard AC generator control apparatus described above, the erroneous operation of the switching circuit due to a leakage current can be suppressed satisfactorily, whereby the output voltage of the AC generator is prevented from increasing abnormally, to a great advantage.

In a preferred mode for realizing the second aspect of the invention, the resistor should have a resistance value which falls within a range of 10 Ω to 1000 Ω.

By using the resistor having a resistance value mentioned above, the erroneous operation of the switching circuit due to the leakage current can be suppressed more positively.

For realizing the second aspect of the invention, the switching circuit may preferably be constituted by a plurality of power transistors connected in the form of a Darlington circuit.

With the arrangement described above, the erroneous operation of the switching circuit due to the leakage current can be suppressed satisfactorily with high reliability, whereby the output voltage of the AC generator can be prevented from abnormal rising more positively.

In yet another preferred mode for realizing the second aspect of the invention, the switching circuit may be constituted by using a single power transistor.

With the arrangement described above, the switching circuit can be implemented inexpensively while protecting the switching circuit against erroneous operation due to the leakage current with the output voltage of the AC generator being prevented from rising abnormally.

In a further preferred mode for realizing the second aspect of the invention, the switching circuit may be constituted by employing a MOSFET (Metal-Oxide-Semiconductor Field-Effect Transistor)-type power transistor.

With the above arrangement, similar and advantageous effects as mentioned previously can be achieved as well. Namely, the erroneous operation of the switching circuit due to the leakage current can be suppressed with the output voltage of the AC generator being prevented from abnormal rise.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
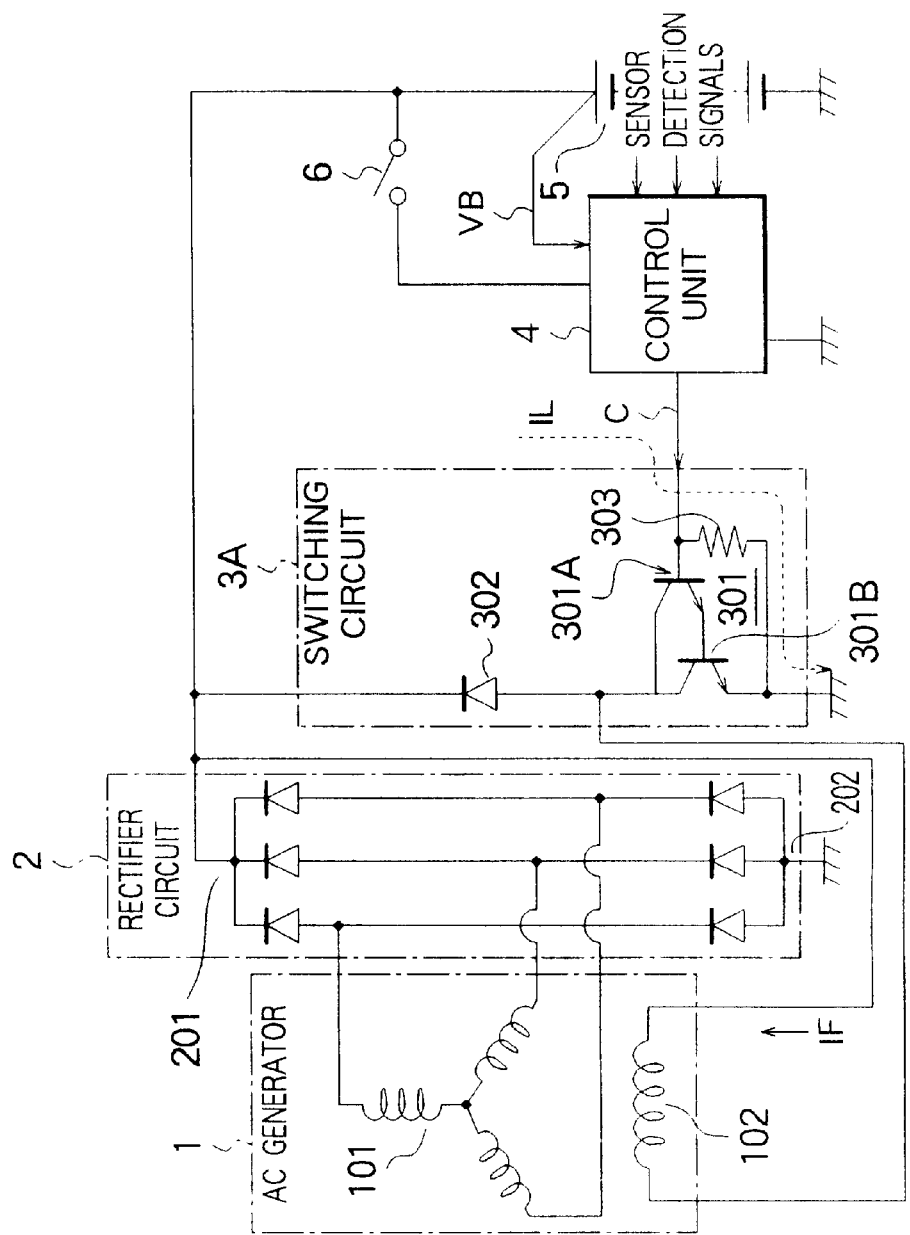
FIG. 1 is a circuit diagram showing a configuration of a vehicle-onboard AC generator control apparatus according to a first embodiment of the present invention.

Now, the present invention will be described in detail in conjunction with what is presently considered as preferred or typical embodiments thereof by reference to the drawings. In the following description, like reference characters designate like or corresponding parts throughout the several views.

Embodiment 1

Figure 7:
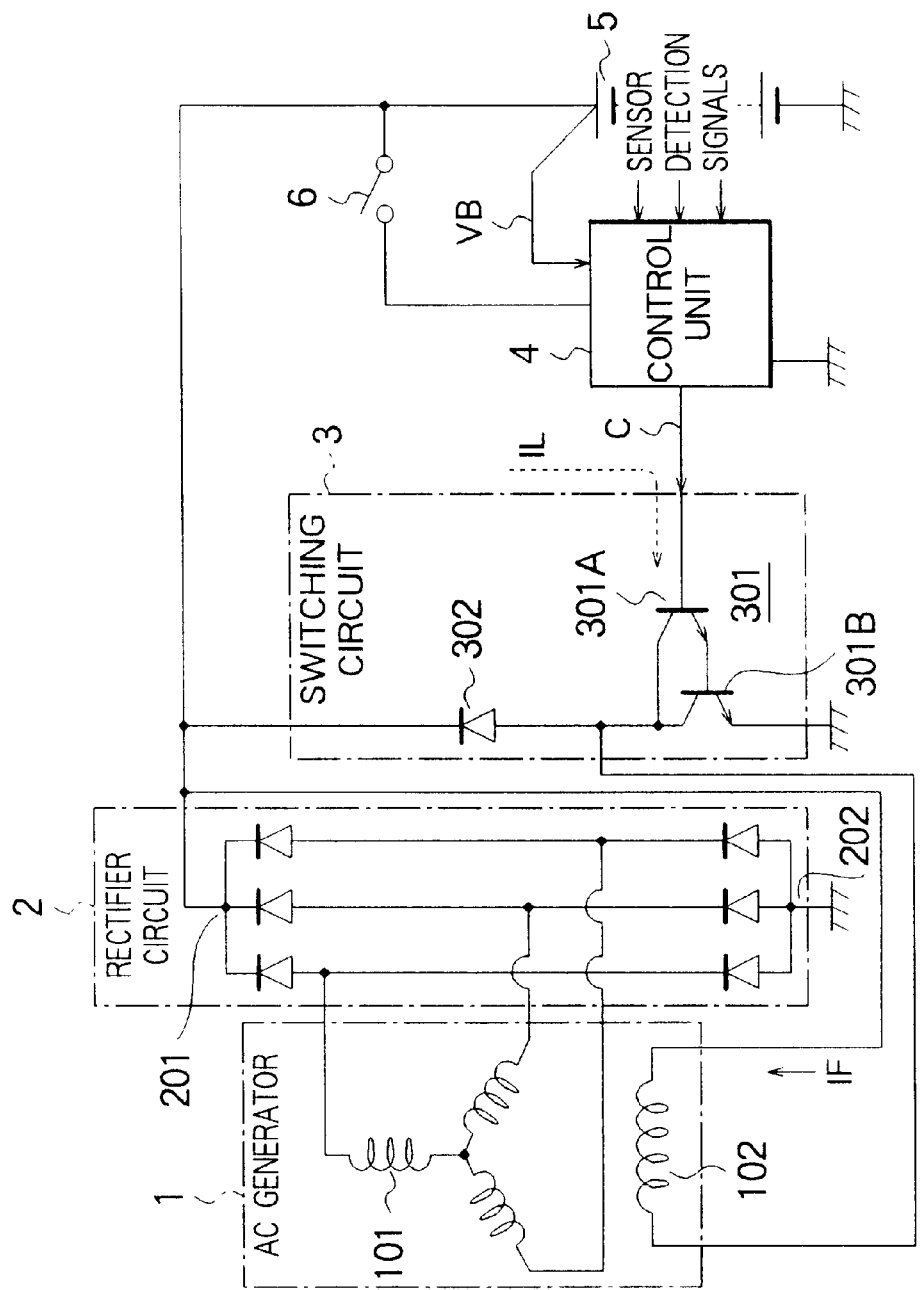
FIG. 7 is a circuit diagram showing a circuit configuration of a vehicle-onboard AC generator control apparatus known heretofore.

Now, a vehicle-onboard AC generator control apparatus according to a first embodiment of the present invention will be described by reference to FIG. 1 which shows schematically in a circuit diagram a general arrangement of the vehicle-onboard AC generator control apparatus according to the first embodiment of the present invention. Incidentally, in FIG. 1, circuit components or elements similar or equivalent to those described hereinbefore by reference to FIG. 7 are denoted by like reference characters and repeated description thereof will be omitted.

According to the teachings of the invention incarnated in the instant embodiment, a resistor 303 is inserted between the control input terminal of the switching circuit denoted by reference character 3A and the ground potential for allowing the leakage current IL to bypass the power transistor circuitry 301 constituted by the power transistors 301A and 301B connected in the form of a Darlington circuit, as described hereinbefore in conjunction with the conventional control apparatus. The resistance value of the resistor 303 should preferably be so selected as to lie within a range of 10 Ω to 1000 Ω by taking into account the ordinarily expected value of the leakage current IL (12 mA or less). Parenthetically, in the case of the vehicle-onboard AC generator control apparatus now under consideration, the resistance value of the resistor 303 is selected to be on the order of 100 Ω. With the exception of the resistor 303 is provided, as mentioned above, the structure of the control apparatus is substantially similar to the conventional one shown in FIG. 7.

Now, operation of the vehicle-onboard AC generator control apparatus shown in FIG. 1 will be described. Since operation of the AC generator 1 has been described hereinbefore, repetition thereof will be omitted.

With the arrangement of the vehicle-onboard AC generator control apparatus shown in FIG. 1, the object of the invention can be achieved in that even if a leakage current IL flows to the control input terminal of the switching circuit 3A (and hence to the base electrode of the power transistor 301A of the Darlington circuitry), as indicated by the broken line path, the leakage current IL is shunted to the ground by way of the resistor 303. Thus, the power transistor circuitry 301 is protected against erroneous operation (i.e., erroneous turn-on operation).

More specifically, the base drive voltage for the Darlington power transistor circuitry 301 is usually 1.2 V. However, by inserting the resistor 303, e.g. of 100 Ω, as mentioned above, the base voltage of the power transistor circuitry 301 is prevented from increasing beyond 1.2 V even for the leakage current IL not greater than 12 mA, as can be seen in FIG. 1. Thus, the power transistor circuitry 301 is protected against the erroneous turn-on operation due to the leakage current IL.

In this manner, such unwanted situation that the field current IF rises up abnormally to a level for causing the output voltage of the AC generator 1 to increase to an excessively high level can be excluded, whereby the electric devices or fittings of the motor vehicle inclusive of the battery 5 can be protected against injury or damage.

Although it has been assumed that the resistance value of the resistor 303 is 100 Ω, it should be appreciated that the resistance of the resistor 303 may be selectively set at a value within a range of 10 Ω to 1000 Ω in dependence on various conceivable circuit specifications.

Embodiment 2

In the case of the vehicle-onboard AC generator control apparatus according to the first embodiment of the invention, a pair of power transistors 301A and 301B connected in the form of Darlington circuit are employed as the switching elements for constituting the switching circuitry incorporated in the switching circuit 3. However, the concept of the present invention can equally be realized by using a single power transistor.

Figure 2:
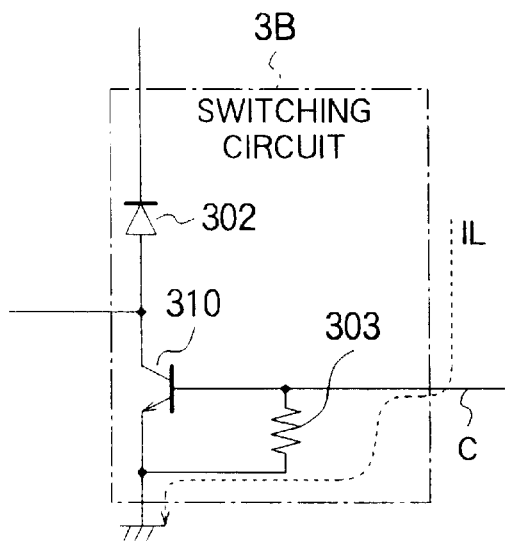
FIG. 2 is a diagram showing a circuit configuration of a switching circuit constituting a part of the control apparatus according to a second embodiment of the present invention.

FIG. 2 is a diagram showing a circuit configuration of a switching circuit designated by reference character 3B according to a second embodiment of the present invention, in which a single power transistor 310 is employed.

In the vehicle-onboard AC generator control apparatus according to the second embodiment of the invention, the value of the resistor 303 for shunting the leakage current IL to the ground is selected to be on the order of 50 Ω, only by way of example.

More specifically, the base drive voltage for the switching circuitry constituted by the single power transistor 310 is usually 0.6 V. By inserting the resistor 303 having a resistance value of 50 Ω between the base of the transistor 310 and the ground potential, as mentioned above, the base voltage of the power transistor 310 is prevented from increasing beyond 0.6 V for the leakage current IL not larger than 12 mA. Thus, the power transistor 310 is protected against erroneous turn-on operation due to the leakage current IL.

Thus, such undesirable state that the field current IF rises up abnormally to a level for causing the output voltage of the AC generator 1 to increase excessively high can be prevented, whereby the electric devices or fittings of the motor vehicle inclusive of the battery 5 can be protected against injury, as in the case of control apparatus described previously in conjunction with the first embodiment of the invention.

Embodiment 3

In the case of the control apparatus according to the second embodiment of the invention, a bipolar power transistor 310 is employed as the switching element of the switching circuit 3B. However, the present invention can equally be implemented by using a MOSFET (Metal-Oxide-Semiconductor Field-Effect Transistor)-type power transistor 320.

Figure 3:
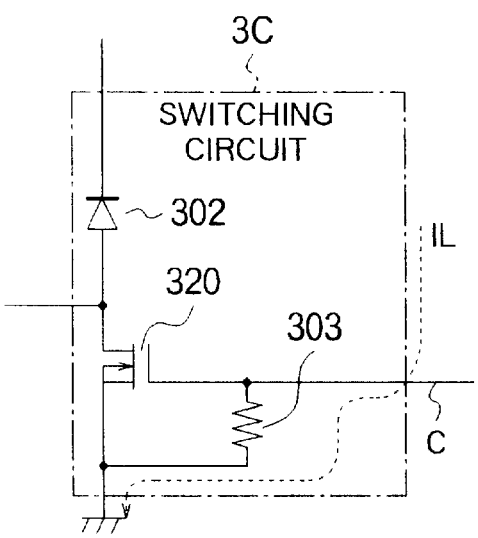
FIG. 3 is a diagram showing a circuit configuration of a switching circuit constituting a part of the control apparatus according to a third embodiment of the present invention.

FIG. 3 is a diagram showing a circuit configuration of a switching circuit (designated by 3C) according to a third embodiment of the present invention, in which the MOSFET-type power transistor 320 is employed.

In the vehicle-onboard AC generator control apparatus now under consideration, the value of the resistor 303 for shunting the leakage current IL to the ground is selected to be on the order of 160 Ω, only by way of example.

The gate drive voltage for the MOSFET-type power transistor circuitry 320 is usually 2 V. Accordingly, by inserting the resistor 303 of 160 Ω between the gate and the ground potential, as mentioned above, the gate voltage of the power transistor circuitry 310 is prevented from increasing beyond 2 V for the leakage current IL not larger than 12 mA. Thus, the MOSFET-type power transistor 320 is protected against the erroneous turn-on operation due to the leakage current IL.

Thus, the field current IF of the AC generator 1 is prevented from increasing abnormally to a level for causing the output voltage thereof to increase excessively high, whereby the electric devices or fittings of the motor vehicle inclusive of the battery 5 can be protected against injury or damage.

Embodiment 4

In the case of the vehicle-onboard AC generator control apparatus described above, the resistor 303 for shunting the leakage current IL from the power supply terminal of the switching circuit to the ground is inserted between the control input terminal of the switching circuit and the ground potential on the assumption that the switching circuit is of N-channel type (i.e., a so-called low-side switch). However, when the switching circuit is designed to operate with polarity opposite or reverse to that described hereinbefore (i.e., when the switching circuit is of P-channel type, a so-called high-side switching circuit), the resistor 303 for shunting the leakage current to the ground may be inserted between the control input terminal and the power supply terminal of the switching circuit.

Figure 4:
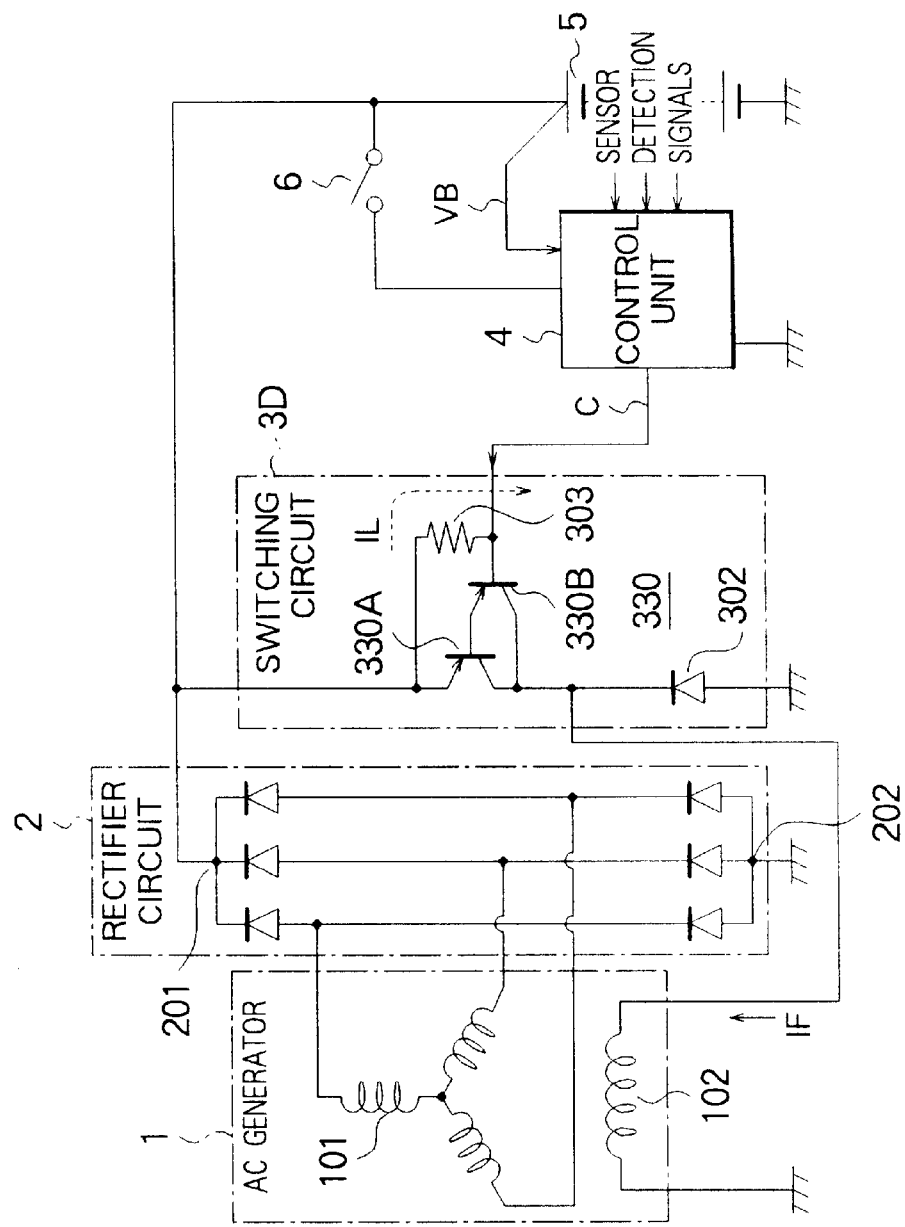
FIG. 4 is a circuit diagram showing a configuration of a vehicle-onboard AC generator control apparatus according to a fourth embodiment of the present invention.

FIG. 4 is a circuit diagram showing a switching circuit for the vehicle-onboard AC generator control apparatus according to a fourth embodiment of the present invention, in which P-channel type power transistors 330A and 330B connected in the form of Darlington circuit are employed.

Operation of the switching circuit designated by reference character 3D is similar to that of the switching circuit 3A, 3B, 3C except that the logical polarity of the control signal C applied to the switching circuit 3D from the control unit 4 is reversed.

The resistor 303 for shunting the leakage current IL of negative or minus polarity is inserted between the control input terminal of the switching circuit 3D, i.e., the base of the power transistor 330B constituting a part of the Darlington-type switch circuitry and the power supply terminal of the switching circuit 3D. Needless to say, the power supply terminal of the switching circuit 3D is connected to the output terminal of the AC generator 1, i.e., an anode electrode of the battery 5.

When the so-called high-side switch is employed, as mentioned above, the switching circuit 3D is turned on (closed) and becomes incapable of performing the switching operation when the voltage applied to the control input terminal is lowered to the driving voltage due to the leakage current IL occurring between the control input terminal and the ground potential. Thus, it is taught according to the invention incarnated in the instant embodiment of the invention to insert the resistor 304 in the manner described above to thereby supplement the leakage current IL flowing to the ground from the power supply terminal, in order to prevent the voltage of the control input terminal from lowering. With this arrangement, the high-side type switching circuit 3D can be protected against erroneous operation with the AC generator and other onboard devices being prevented from injuries.

More specifically, referring to FIG. 4, the leakage current IL supplied from the power supply terminal of the power transistor circuitry 330, as indicated by a broken line path, is shunted to the ground. Accordingly, the base voltage of the p-channel power transistor circuitry 330 is prevented from decreasing below the drive voltage (power supply terminal voltage of −1.2 V) due to the leakage current IL not greater than 12 mA.

Thus, the p-channel power transistor circuitry 330 is protected against the erroneous turn-on operation due to the leakage current IL. Further, such unwanted situation that the field current IF rises up abnormally to a level for causing the output voltage of the AC generator 1 to increase excessively high can be excluded, whereby the electric devices or fittings of the motor vehicle inclusive of the battery 5 can be protected against injury or damage, as in the cases of the preceding embodiments of the invention.

Embodiment 5

In the case of the vehicle-onboard AC generator control apparatus according to the fourth embodiment of the invention, a pair of power transistors 330A and 330B connected in the form of Darlington circuit are employed as the components for constituting the switching circuitry incorporated in the switching circuit 3. However, the concept of the present invention can be realized by using a single power transistor 340, as is illustrated in FIG. 5.

Figure 5:
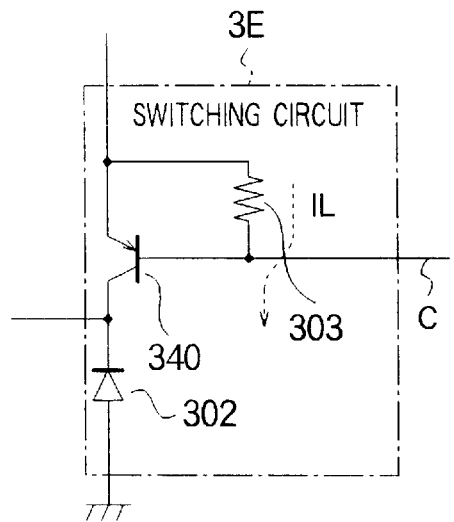
FIG. 5 is a diagram showing a circuit configuration of a switching circuit constituting a part of the control apparatus according to a fifth embodiment of the present invention.

Parenthetically, in the case of the switching circuit 3E shown in FIG. 5, the resistance value of the resistor 303 is selected to be on the order of 50 Ω. The base voltage of the power transistor 340 is prevented from decreasing below the drive voltage (power supply terminal voltage of −0.6 V) due to the leakage current IL not larger than 12 mA.

Thus, the power transistor 340 is protected against the erroneous turn-on operation due to the leakage current IL. Further, such unwanted situation that the field current IF rises abnormally up to a level for causing the output voltage of the AC generator 1 to increase excessively high can be excluded, whereby the electric devices or fittings of the motor vehicle inclusive of the battery 5 can be protected against injury or damage, as in the case of the vehicle-onboard AC generator control apparatus described previously.

Embodiment 6

Figure 6:
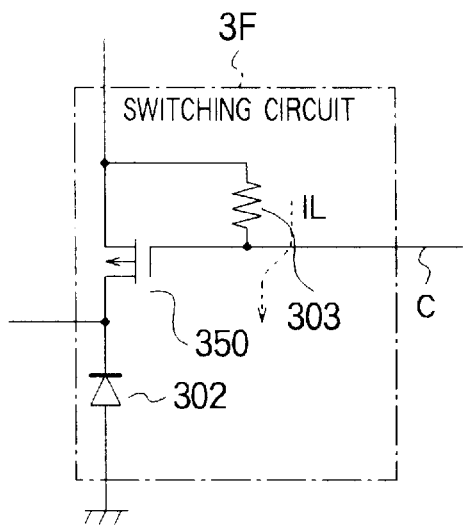
FIG. 6 is a diagram showing a circuit configuration of a switching circuit constituting a part of the control apparatus according to a sixth embodiment of the present invention.

In the case of the switching circuit according to the fifth embodiment of the invention, a bipolar-type power transistor 340 is employed. However, the concept of the present invention can equally be realized by using a MOSFET-type power transistor 350, as illustrated in FIG. 6.

Parenthetically, in the case of the switching circuit 3F now under consideration, the resistance value of the resistor 303 is selected to be on the order of 160 Ω. The gate voltage of the MOSFET-type power transistor 350 is prevented from reaching the drive voltage (power supply terminal voltage of −2 V) due to the leakage current IL larger than 12 mA.

Thus, the power transistor circuitry 350 is protected against the erroneous turn-on operation due to the leakage current IL. Further, the field current IF is prevented from rising abnormally up to a level for causing the output voltage of the AC generator 1 to increase excessively high, whereby the electric devices or fittings of the motor vehicle inclusive of the battery 5 can be protected against injury or damage, similarly to the vehicle-onboard AC generator control apparatus described previously.

Many modifications and variations of the present invention are possible in the light of the above techniques. It is therefore to be understood that within the scope of the appended claims, the invention may be practiced otherwise than as specifically described.

What is claimed is:

1. A control apparatus for onboard AC generator for a motor vehicle, comprising:

an AC generator including a field winding;

a rectifier circuit for converting an output voltage of said AC generator into a DC voltage;

a battery charged with said DC voltage;

a switching circuit for turning on/off a current flow loop extending through said field winding, said switching circuit comprising a plurality of transistors connected in a Darlington circuit, wherein said plurality of transistors are NPN transistors;

a control unit for controlling on/off-operation of said switching circuit so that a voltage appearing at a charging terminal of said battery matches a predetermined voltage level; and a resistor connected between a control input terminal of one of said plurality of transistors of said switching circuit and a ground potential.

2. The control apparatus according to claim 1, wherein said resistor has a resistance value which falls within a range from 10 Ω to 1000 Ω.

3. A control apparatus for an onboard AC generator for a motor vehicle, comprising:

an AC generator including a field winding;

a rectifier circuit for converting an output voltage of said AC generator into a DC voltage;

a battery charged with said DC voltage;

a switching circuit for turning on/off a current flow loop extending through said field winding, wherein said switching circuit comprises a single power transistor, wherein said single power transistor is one of a NPN transistor and a N-channel metal-oxide semiconductor field effect transistors;

a control unit for controlling on/off-operation of said switching circuit so that a voltage appearing at a charging terminal of said battery matches a predetermined voltage level; and a resistor connected between a control input terminal of said single power transistor of said switching circuit and a ground potential.

4. A control apparatus for an onboard AC generator for a motor vehicle, comprising:

an AC generator having a field winding;

a rectifier circuit for converting an output voltage of said AC generator into a DC voltage;

a battery charged with said DC voltage;

a switching circuit for turning on/off a current flow loop extending through said field winding, said switching circuit comprising a plurality of transistors connected in the form of a Darlington circuit, wherein said plurality of transistors are PNP transistors;

a control unit for controlling on/off-operation of said switching circuit so that a voltage appearing at a charging terminal of said battery is maintained at a level conforming with a predetermined voltage level; and a resistor connected between a control input terminal of one of said plurality of transistors of said switching circuit and a power supply terminal of said switching circuit.

5. The control apparatus according to claim 4, wherein said resistor has a resistance value which is set at a value falling within a range from 10 Ω to 1000 Ω.

6. A control apparatus for an onboard AC generator for a motor vehicle, comprising:

an AC generator including a field winding;

a rectifier circuit for converting an output voltage of said AC generator into a DC voltage;

a battery charged with said DC voltage;

a switching circuit for turning on/off a current flow loop extending through said field winding, wherein said switching circuit comprises a single power transistor, wherein said single power transistor is one of a PNP transistor and a P-channel metal-oxide semiconductor field effect transistor;

a control unit for controlling on/off-operation of said switching circuit so that a voltage appearing at a charging terminal of said battery matches a predetermined voltage level; and a resistor connected between a control input terminal of said single power transistor of said switching circuit and a power supply terminal of said switching circuit.

* * * * *